May 15, 1928.   F. FRASER   1,670,110
METHOD AND APPARATUS FOR PRODUCING PRESSED SHEET GLASS
Filed Oct. 27, 1924
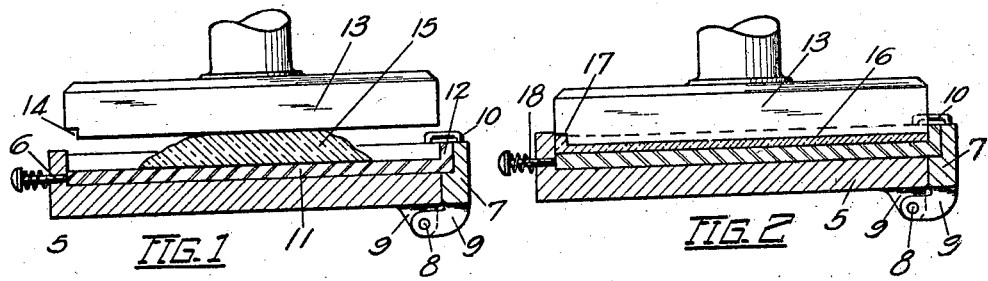
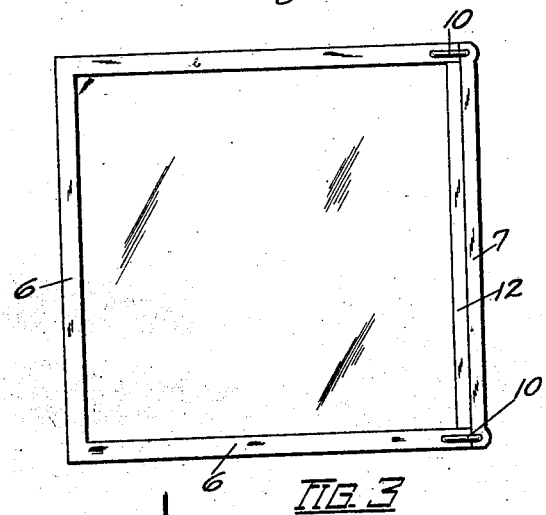
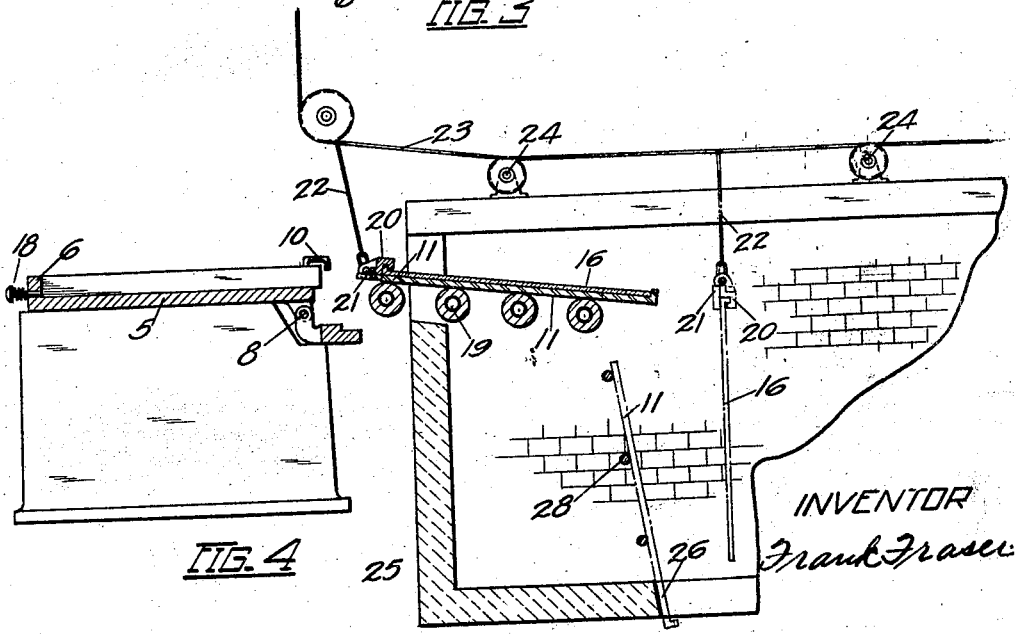
INVENTOR
Frank Fraser Patented May 15, 1928.

1,670,110

UNITED STATES PATENT OFFICE.

FRANK FRASER, OF TOLEDO, OHIO, ASSIGNOR TO THE LIBBEY-OWENS SHEET GLASS COMPANY, OF TOLEDO, OHIO, A CORPORATION OF OHIO.

METHOD AND APPARATUS FOR PRODUCING PRESSED SHEET GLASS.

Application filed October 27, 1924. Serial No. 746,204.

The present invention relates to a method and apparatus for producing pressed sheet glass, and has particular reference to the manufacture of plate glass by means of a suitable mold wherein it is not necessary to polish or grind and polish the sheet after it has been molded.

An important object of the invention is to produce a pressed sheet of glass in a mold formed from a non-corrosive metal alloy.

A further object of the invention is to produce a sheet of plate glass by means of a mold formed from a non-corrosive metal alloy, which will not need polishing or grinding and polishing to condition the surfaces, as the surfaces produced by the non-corrosive metal alloy mold will be of such a high quality that the sheet will favorably compare with a sheet of plate glass produced by any of the present well-known methods.

A still further object of the invention is to produce a sheet of pressed plate glass in this manner wherein the sheet is passed through an annealing leer in a vertical position to prevent surface changes or formation of waves after the sheet has been removed from the mold in which it is formed.

Other objects and advantages of the invention will become apparent during the course of the following description.

In the drawings wherein like numerals are employed to designate like parts throughout the same, Fig. 1 is a longitudinal vertical section through the molding apparatus at the beginning of the operation thereof, Fig. 2 is a similar section after the glass has been pressed into sheet form.

Fig. 3 is a top plan view of a portion of the mold, and

Fig. 4 is a fragmentary sectional view showing the removal of the sheet from the mold and its entrance into the annealing leer.

The distinction between so-called sheet glass or window glass and plate glass is that the plate glass is ground and polished after its formation to produce a uniform thickness of sheet having perfectly flat and smooth surface faces. The sheet glass so-called is not ground and polished after its formation.

Heretofore, the plate glass blanks have been produced by rolling on a suitable table, the blank thus formed being substantially thicker than the desired thickness of finished sheet. After the formation of the blank in this manner it has been necessary to grind and polish both surfaces of the blank to produce a sheet of the desired finish.

In accordance with the present invention the sheet of plate glass is formed in a suitable mold which will produce surfaces on the blank not requiring grinding and polishing to give the desired effect. In other words, the finished sheet of plate glass is formed in the mold and does not need any further surface conditioning other than that of annealing.

By thus forming the plate glass in accordance with this invention the time and expense of grinding and polishing the blanks has been obviated so that plate glass can be manufactured much more cheaply and much more quickly than heretofore.

Referring to the drawings, the numeral 5 designates the mold which is formed from a non-corrosive metal alloy such as nichrome, monel, stellite or stainless steel, which is an iron and chromium combination. The above list of non-corrosive metal alloys does not include all of the metals which may be used, but is merely illustrative of some of the types of metals which may satisfactorily be used in the production of sheet plate glass in accordance with the present invention.

The mold 5 is provided with the upstanding flange 6, preferably on three sides thereof, the said flanges 6 being preferably formed integral with the bottom portion 5. The open side is closed by means of the pivoted gate 7 which is hinged to the portion 5 by means of the pin 8 passing through the ears 9 carried by the gate 7 and mold 5 respectively. The gate 7 is normally held in operative position by a latch 10, the said latch 10 being engaged with the gate during the pressing operation.

To facilitate the removal of the sheet after it has been pressed, a removable plate 11 having the upstanding flange 12 along one edge thereof, is adapted to be placed within the mold 5. If such a plate 11 is used, it is not absolutely necessary that the entire mold 5 be formed from the non-corrosive metal alloy as the plate 11 can be formed from such a metal with equal results, as the plate 11 and the flanges 6 are the only portions coming in contact with the sheet.

Arranged above the mold 5 is a plunger 13 which may be entirely formed from one of the non-corrosive metal alloys above pointed out, or may be faced with such an alloy. One lower edge of the plunger 13 is notched as at 14 for the purposes to be fully pointed out hereinafter. In the construction of the sheet, a mass of molten glass 15 is introduced within the mold or upon the plate 11 in any suitable manner, the quantity of molten glass being sufficient to produce a finished sheet of the desired thickness. Of course the quantity of glass 15 will depend upon the size of the mold and the thickness of the sheet being formed. After the glass 15 has been placed within the mold, the plunger 13 is moved downwardly to press the glass 15 in a position as shown in Fig. 2, thus forming a sheet 16. In Fig. 2 it will be seen that an upstanding lip 17 will be formed on the sheet 16 to facilitate removal and handling of the sheet from the mold.

After the sheet has been formed the gate 7 is swung downwardly as shown in Fig. 4, and the plate 11 and sheet 16 are removed from the mold by means of the spring-pressed plunger 18 operable through one of the flanges 6 against one edge of the said plate. In the preferred form of construction, the plate 11 and sheet 16 are moved out upon a plurality of rollers 19 which are slightly inclined. To support the sheet a clip 20 having a portion for engagement with the lip 17 on the sheet is provided, while a movable plate 21 is adapted to engage the opposite side of the sheet upon removal of the plate 11. The clip 20 is carried by a cable 22 connected to a conveyor 23 movable on the track 24. As the plate 11 and sheet 16 are advanced, as shown in Fig. 4, they will assume a vertical position whereupon the plate will drop down through the leer 25 and out through a suitable opening 26 formed in the bottom thereof. Rolls 28 are provided to take care of the path which the plate 11 follows. The sheet is then passed through the annealing leer to properly condition the same.

It will be found that when the sheet has thus been passed through the annealing leer it can be cut to the desired size and is then ready for use as plate glass. In other words, it is not necessary to grind and polish the sheet thus formed to properly condition it for plate glass use, as the contact of the glass in the mold formed from a non-corrosive metal alloy will not injure the surface of the glass, but will give a sheet which is of uniform thickness and which has surfaces equally as good as surfaces formed by the old methods of making plate glass.

By removing the sheet 16 and plate 11, as indicated in Fig. 4, the sheet is not in any way strained nor buckled due to the fact that the plate 11 supports the sheet entirely until the sheet and plate have assumed a vertical position, after which the sheet is suspended in a vertical position during the annealing process, thus preventing waving or buckling of the sheet. It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. A mold for forming finished plate glass formed from a non-corrosive metal alloy comprising a body portion, a removable member arranged within the mold and supported by the bottom thereof, and a pivoted side wall carried by the mold to permit the removal of the said plate.

2. The process of producing pressed sheet glass which consists in placing a quantity of molten glass in a mold and simultaneously pressing said glass to sheet form and forming a lip thereon to facilitate handling thereof by bringing into contact therewith a notched pressing member.

3. A mold for forming plate glass, comprising a body portion, a removable member arranged within the mold and constructed from a non-corrosive metal alloy, and a pivoted side wall carried by the body portion to permit the removal of said member.

4. A mold for forming plate glass, comprising a body portion, a removable member arranged within the mold, a pivoted side wall carried by the body portion to permit the removal of said member and means for engaging said member for facilitating the removal thereof.

5. A mold for producing pressed sheet glass including a body portion, and a pivoted side wall carried by the body portion.

6. A mold for producing pressed sheet glass including a body portion, a pivoted sidewall carried by the body portion, and a spring pressed plunger for facilitating the removal of said sheet from said mold.

7. In sheet glass apparatus, a mold for receiving a quantity of molten glass, and a notched member for pressing said glass to sheet form and for simultaneously forming a lip thereon to facilitate handling thereof.

Signed at Toledo, in the county of Lucas and State of Ohio, this 23rd day of October, 1924.

FRANK FRASER.